(No Model.)

M. B. SCHNEIDER.

AXLE BOX.

No. 558,211. Patented Apr. 14, 1896.

Witnesses:
Saml R. Seibert.
Jas. B. Lackey.

Inventor:
Micheal B. Schneider
By Taylor & Payne
Attorneys

ANDREW B. GRAHAM, PHOTO-LITHO. WASHINGTON, D.C.

UNITED STATES PATENT OFFICE.

MEICHEAL B. SCHNEIDER, OF NEW CASTLE, PENNSYLVANIA.

AXLE-BOX.

SPECIFICATION forming part of Letters Patent No. 558,211, dated April 14, 1896.

Application filed March 30, 1895. Serial No. 543,847. (No model.)

*To all whom it may concern:*

Be it known that I, MEICHEAL B. SCHNEIDER, a citizen of the United States, residing at New Castle, in the county of Lawrence and State of Pennsylvania, have invented certain new and useful Improvements in Axle-Boxes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in axle-boxes and means for securing them to the spindles of axles, whereby I secure important advantages over the ordinary forms of such devices.

As is well known to those skilled in the art to which my invention pertains, the ordinary axle-boxes are very objectionable in use, owing to the liability of the nut which holds the wheel on the box and the thread on the spindle to wear, thus rendering them practically useless. To remedy this, it is necessary to place the vehicle in the hands of a skilled workman to have the threads on the spindle recut and a new nut supplied. This is an expensive and laborious proceeding, besides entailing a waste of time to the owner of the vehicle.

The object of my invention is to obviate the above and other defects; and it consists in the novel construction and combination of parts hereinafter fully described and claimed.

Figure 1:
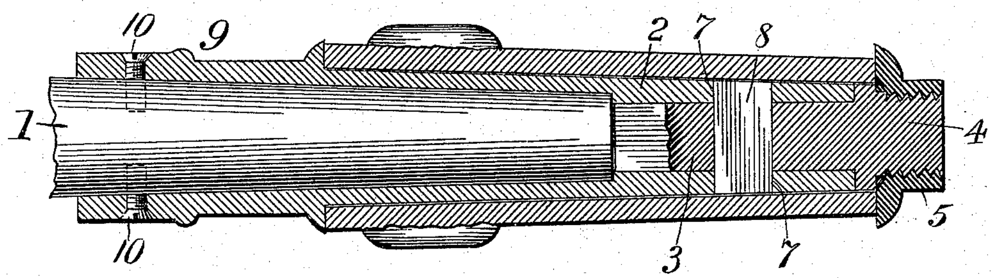
Figure 2:
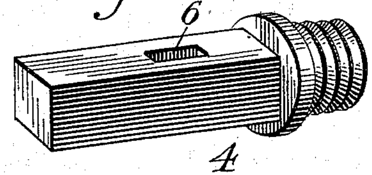
Figure 3:
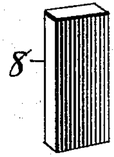
Figure 4:
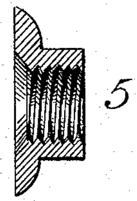

In the accompanying drawings, Figure 1 is a longitudinal sectional view of an axle-box constructed in accordance with my invention. Fig. 2 is a perspective view of the stud detached. Fig. 3 is a similar view of the locking or retaining key. Fig. 4 is a longitudinal sectional view of the nut detached.

In the said drawings, the reference-numeral 1 designates an axle-spindle of any ordinary or usual construction, and 2 the axle-box, made hollow to fit upon the spindle and having its outer end formed with a tapering rectangular hole or opening to receive the correspondingly-formed shank 3 of a stud 4, the outer end of which is screw-threaded to receive the nut 5, by which the wheel is retained upon the box. The shank 3 is formed with a tapering rectangular hole or opening 6, which, when the shank is inserted in the end of the box, registers or coincides with alined apertures 7, formed in the box near the outer end thereof. Passing through these apertures and hole is a locking-pin 8, by which the stud is retained in place in the end of the box. Near its inner end the box is provided with the usual sand-band 9, and is also formed with a series of apertures or holes for the passage of screws 10, which engage with correspondingly-threaded recesses in the spindle for holding the box thereon.

In using the invention the box is placed on the spindle and secured in place by the screws 10. The shank of the stud is then inserted in the end of the box and the key driven in the apertures therein, passing through the hole in the shank and thus securely holding the shank in place. The wheel is then placed on the box and the nut screwed on the screw-threaded end of the stud. It is proposed in practice that the drivers of the vehicle be provided with extra studs and nuts, so that when the latter become loose through wear they can be removed and a new stud be substituted for the damaged one, which can be readily accomplished by knocking out the locking-key, thus dispensing with the services of a skilled mechanic and effecting a saving in time and expense.

Having thus fully described my invention, what I claim is—

The combination with the axle-spindle, of an axle-box secured thereon having a portion extending beyond the end of the spindle and having an aperture in said portion and alined radial apertures, a screw-threaded stud having a shank fitting said aperture, a removable key passing through said alined apertures, and through an aperture in said shank, a sleeve on the box extending over said key and securing the same in place, and a flanged retaining-nut engaging said screw-threaded stud substantially as described.

In testimony whereof I affix my signature in presence of two witnesses.

MEICHEAL B. SCHNEIDER.

Witnesses:

JOHN L. MCCLELLAND,
W. P. ELLIS.